C. A. OVESON.
WOODWORKING MACHINE.
APPLICATION FILED NOV. 25, 1918.
1,313,950.
Patented Aug. 26, 1919.
2 SHEETS—SHEET 1.
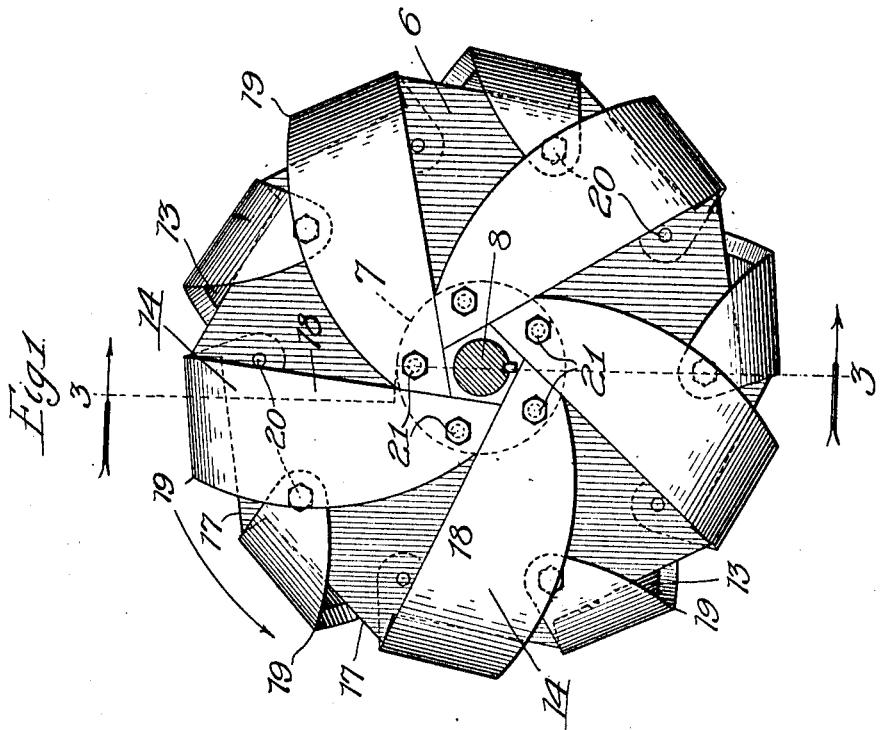
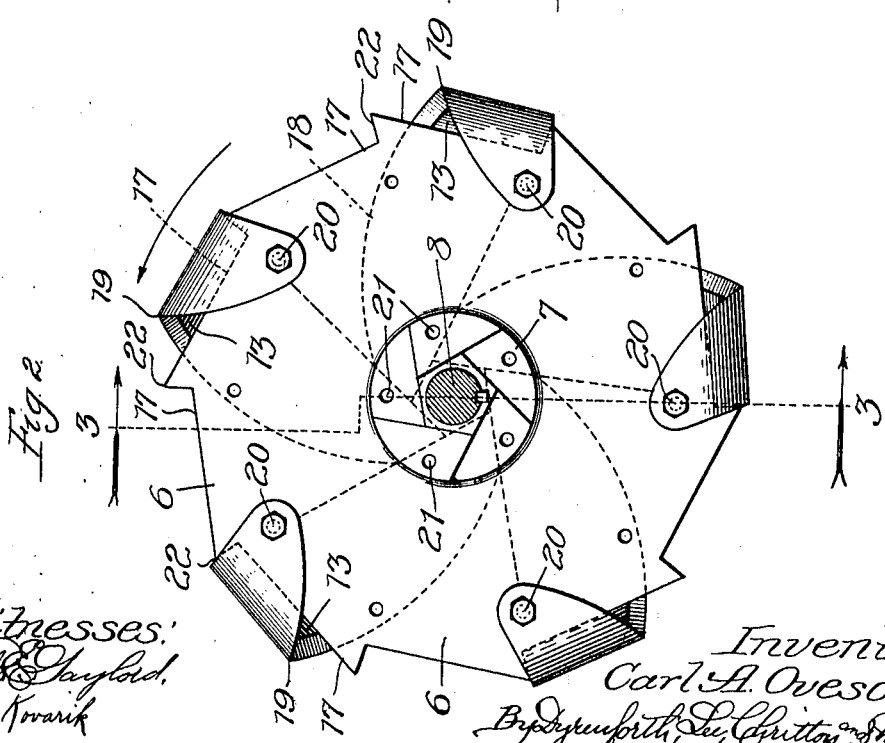
Witnesses:
Inventor:
Carl A. Oveson,

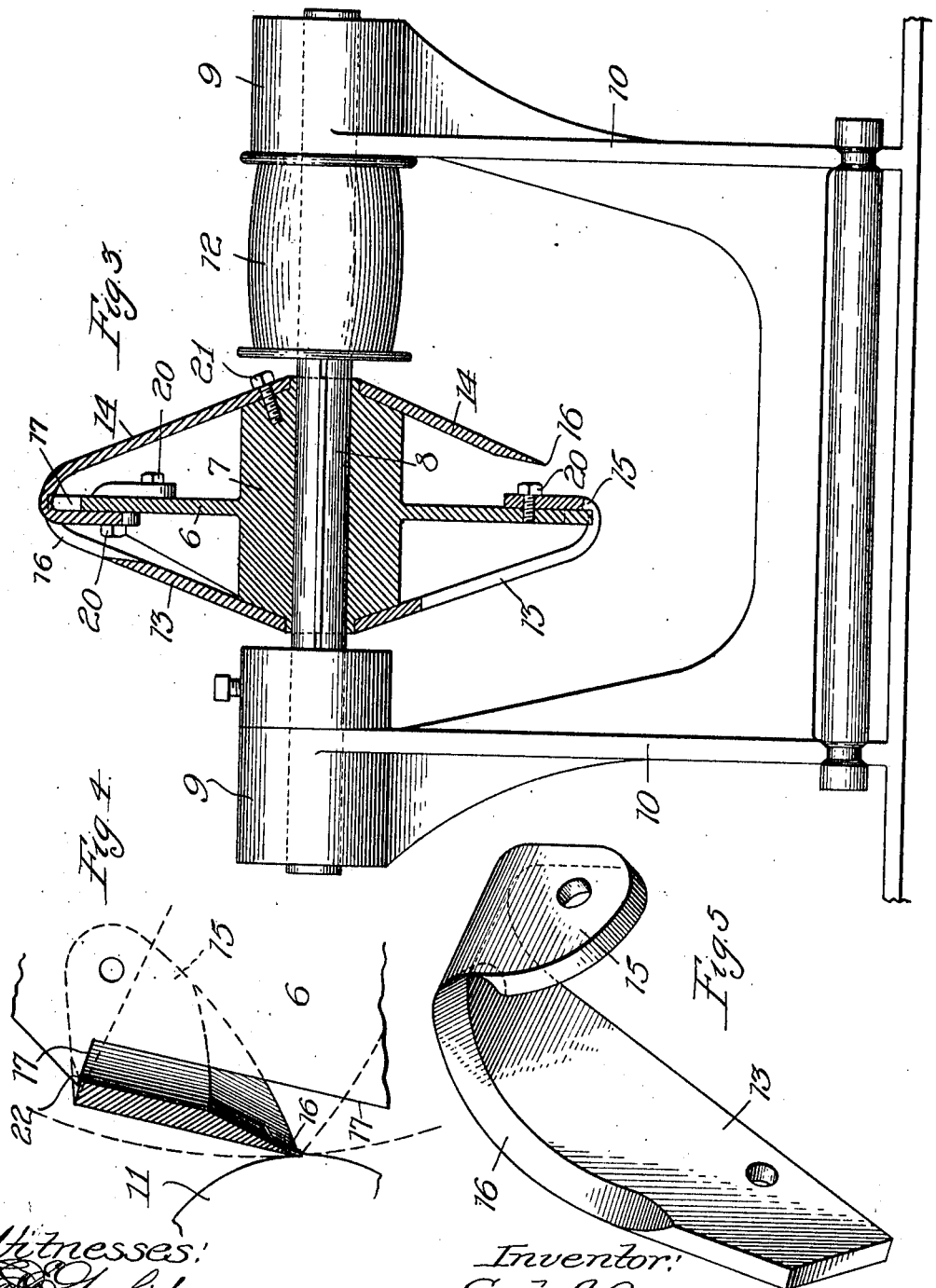

UNITED STATES PATENT OFFICE.

CARL A. OVESON, OF CHICAGO, ILLINOIS, ASSIGNOR TO HERBERT S. MILLS, OF CHICAGO, ILLINOIS.

WOODWORKING-MACHINE.

1,313,950.      Specification of Letters Patent.      Patented Aug. 26, 1919.

Application filed November 25, 1918. Serial No. 264,000.

*To all whom it may concern:*

Be it known that I, CARL A. OVESON, a citizen of the United States, residing at Chicago, in the county of Cook and State of Illinois, have invented a new and useful Improvement in Woodworking-Machines, of which the following is a specification.

My invention relates, more particularly, to the cutters used in woodworking machines for producing articles of irregular form, as, for example, propeller-blades for aeroplane engines; and my object, generally stated, is to provide improvements in cutters to the end that they will operate on the work without splintering it regardless of the depth of the cut, and by which the highest class of work may be produced, requiring a sanding operation only to finish the article.

As a preface to the following description it may be stated that machines of the general type employing cutters of the general character to which my invention relates, are commonly formed with a head-stock and a tail-stock, between, and by, which the piece of work from which the article is to be formed is supported, the piece of work being rotated during the operation of the machine and during such rotation acted upon by a rotary cutter, which latter is connected with a pattern-follower, to move therewith toward and away from the rotating work, under the action of the pattern while rotating against the follower, the latter being yieldingly forced at all times toward the pattern.

Referring to the accompanying drawing,—

Figure 1 is a view in side elevation of a cutter constructed in accordance with my invention;

Fig. 2 is a similar view, showing the blades at one side of the cutter removed;

Fig. 3 is a section taken at the lines 3, 3 on Figs. 1 and 2 and viewed in the direction of the arrows, showing the cutter mounted on a shiftable frame;

Fig. 4 is a broken view showing the cutter operating on a piece of work, the cutter blade being shown in section; and Fig. 5, a perspective view of one of the similar cutter blades of the cutter.

The particular construction of cutter illustrated is adapted for cutting the work in the travel of the rotary cutter along the work in either direction, though it will be readily understood from the following description that the invention as to its broader features may be incorporated in a cutter having cutting blades adapted to cut the work in the travel of the cutter in one direction only along the work.

The cutter, as shown, comprises a disk 6 having a hub-portion 7 at which it is keyed on a shaft 8, mounted in bearings 9 in a frame 10, which, in the particular construction illustrated, is mounted to move back and forth toward and away from the work illustrated at 11 in Fig. 4, the frame being operatively connected with a pattern-tracer (not shown). The shaft 8 may be driven in any suitable manner, as for example, through a drive-belt (not shown) engaging a pulley 12 on the shaft 8.

The cutter-blades of the cutter device are represented at 13 and 14, those of the series of blades indicated at 13, as to the greater portions thereof, being located at one side of the disk 6 and those indicated at 14 at the opposite side of this disk. Each of the cutter-blades is formed at its toe-portion with a preferably short, deflected, preferably curved, portion 15, each blade being sharpened along one edge thereof, as represented at 16, this sharpened edge of the blade, which is thus rounded at its toe-portion, being preferably curved, as shown, in a direction lengthwise of the blade. The periphery of the disk 6 is notched at intervals, as indicated at 17, and the blades 13 and 14 are applied to the opposite sides of the disk 6 and secured thereto, to extend at their main portions, represented at 18, alongside of the disk at its opposite sides, and partially embrace the periphery of the disk at their deflected toe-portions 15, as shown in the drawings, the cutting blades 13 and 14 being made in rights and lefts in order that their cutting edges shall extend in the same direction circumferentially of the disk, the apices of the blades, represented at 19, extending in the same circumferential plane. The fastening devices for the blades are represented at 20 and 21, and the blades 13 and 14 are so positioned on the disk that their extreme curved portions 15 at the periphery of the disk, as also their main portions 18, are spaced from the disk, as shown more particularly in Fig. 3, and their extreme rear edges extend adjacent the shoulder portions 22 of the disk formed by notching it at 17, as hereinbefore explained, and their cutting edges 16 incline from the heel portions of the blades toward the extreme toe-portions thereof in a rearward direction relative to the direction of rotation of the cutter, as shown by the arrows in Figs. 1 and 2. Thus, in the rotation of the cutter in the direction indicated in the drawings, the blades exert a shearing action against the work, the shear being progressive from a point adjacent the heel of the blade, which engages the outer surface of the work, toward the apices of the toe-portions of the blade where the finishing portion of the cut is effected. In this connection, it will be noted that as the work and cutter move lengthwise relatively, the cutter, usually being the part which moves along the work, the work feeds to the cutter against the cutting edges presented by the main portions 18 of the blades, as well as the cutting edges at the deflected portions 15 of the blades or, in other words, the apices 19 of the cutting edges, so that the cutters feed laterally into the work, the shearing action of the cutter blades as the action progresses in the rotation of the cutter, from the heels of the blades to the toes of the latter, while in the main cutting in a direction crosswise of the axis of the work, also cutting in a plane substantially circumferential of this axis and thus the shearing action merges into a substantially circumferential shearing action at the apices of the blades, and it is because of this functioning of the blades that the work is operated on without splintering the material, and in such a way that the article produced is substantially identical with the pattern.

It will be noted from the foregoing description in connection with the drawings, that a substantial clearance is presented between the cutting edges of the blades and the disk upon which they are supported and thus there is presented a ready vent for the shavings produced by the action of the cutters which pass freely between the blades and the disk.

Furthermore, it will be noted that in the particular arrangement illustrated the finishing cut, namely, that which is effected by the portions of the cutting surfaces represented at 19, is produced by both series of blades, the lateral cutting action referred to being effected by only one set thereof, depending upon the direction in which the cutter is moved lengthwise of its axis.

While I have illustrated my invention as embodied in a structure of a particular form, I do not wish to be understood as intending to limit it thereto, as the same may be variously modified and altered without departing from the spirit of the invention.

What I regard as new and desire to secure by Letters Patent is:

1. A rotary cutter having a cutting edge which inclines from its portion nearest the axis of the cutter toward its outer portion in a rearward direction relative to the direction of rotation of the cutter, the portion of the cutting edge nearest the axis of the cutter extending in a plane crosswise of the axis of the cutter and in a position in advance of said axis and the outer portion of the cutting edge extending in a plane substantially parallel with said axis, whereby the cutting edge is adapted to operate on the work by a progressive shearing action from the portion thereof nearest the axis of the cutter laterally against the work and toward the outer end of the cutter where the work is cut substantially circumferentially, and the work is cut by this shearing action from the outer surface thereof toward the center of the work.

2. A rotary cutter comprising a rotatably mounted support and a cutting blade carried thereby, the cutting edge of said blade inclining from its portion nearest the axis of the cutter toward its outer portion in a rearward direction relative to the direction of rotation of the cutter, the portion of the cutting edge nearest the axis of the cutter extending in a plane crosswise of the axis of the cutter and in a position in advance of said axis and the outer portion of the cutting edge extending in a plane substantially parallel with said axis, whereby the cutting edge is adapted to operate on the work by a progressive shearing action from the portion thereof nearest the axis of the cutter laterally against the work and toward the outer end of the blade where the work is cut substantially circumferentially, and the work is cut by this shearing action from the outer surface thereof toward the center of the work.

3. A rotary cutter having a cutting edge of curved form, said cutting edge inclining from its portion nearest the axis of the cutter toward its outer portion in a rearward direction relative to the direction of rotation of the cutter, the portion of the cutting edge nearest the axis of the cutter extending in a plane crosswise of the axis of the cutter and in a position in advance of said axis and the outer portion of the cutting edge extending in a plane substantially parallel with said axis, whereby the cutting edge is adapted to operate on the work by a progressive shearing action from the portion thereof nearest the axis of the cutter laterally against the work and toward the outer end of the cutter where the work is cut substantially circumferentially, and the work is cut by this shearing action from the outer surface thereof toward the center of the work.

4. A rotary cutter comprising a rotatably mounted support and a series of cutting blades carried thereby, each of said blades having a cutting edge which inclines from its portion nearest the axis of the cutter toward its outer portion in a rearward direction relative to the direction of rotation of the cutter, the portions of the cutting edges nearest the axis of the cutter of one series of blades extending at one side of said support and the corresponding portions of the cutting edges of the other series of blades extending at the opposite side of said support, those portions of the cutting edges nearest the axis of the cutter extending in planes crosswise of the axis of the cutter and in a position in advance of said axis and the outer portions of the cutting edges extending in a plane substantially parallel with said axis and so positioned that all of these outer portions operate on the work in a relative lengthwise movement of the cutter and work, the whole being so constructed and arranged that the cutting edges are adapted to operate on the work by a progressive shearing action from the portions thereof nearest the axis of the cutter laterally against the work and toward the outer ends of the cutters where the work is cut substantially circumferentially, and the work is cut by this shearing action from the outer surface thereof toward the center of the work.

5. A rotary cutter comprising a rotatably mounted disk having notches formed in its periphery and cutting blades carried thereby each provided along one edge with a cutting edge, the cutting edge of each blade inclining from its portion nearest the axis of the cutter toward its outer portion in a rearward direction relative to the direction of rotation of the cutter, the portion of the cutting edge nearest the axis of the cutter extending in a plane crosswise of the axis of the cutter and in a position in advance of said axis and the outer portion of the cutting edge extending in a plane substantially parallel with said axis, whereby the cutting edge is adapted to operate on the work by a progressive shearing action from the portion thereof nearest the axis of the cutter laterally against the work and toward the outer end of the cutter where the work is cut substantially circumferentially, and the work is cut by this shearing action from the outer surface thereof toward the center of the work, said blades extending over the notched portions of said support, but in spaced relation thereto.

6. A rotary cutter comprising a rotatably mounted support and a series of cutting blades carried thereby, said cutting blades being arranged in sets, one set being disposed at one side of said body member and the other set at the opposite side thereof, with the outer extremities of said blades curved, said sets of blades being arranged in staggered relation with their outer curved ends arranged in relatively overlapped relation and fastened at their opposite ends to said body member with clearances between said blades and body member, each of said blades having a cutting edge which inclines from its portion nearest the axis of the cutter toward its outer portion in a rearward direction relative to the direction of rotation of the cutter, the portion of the cutting edge nearest the axis of the cutter extending in a plane crosswise of the axis of the cutter and the outer portion of the cutting edge extending in a plane substantially parallel with said axis, the whole being constructed and arranged to cause the cutting edges of the blades to operate on work by a progressive shearing action from the portions thereof nearest the axis of the cutter laterally against the work and toward the outer end of the cutter where the work is cut substantially circumferentially, and the work is cut by this shearing action from the outer surface thereof toward the center of the work.

CARL A. OVESON.

Copies of this patent may be obtained for five cents each, by addressing the "Commissioner of Patents, Washington, D. C."